United States Patent Office 2,852,056
Patented Sept. 16, 1958

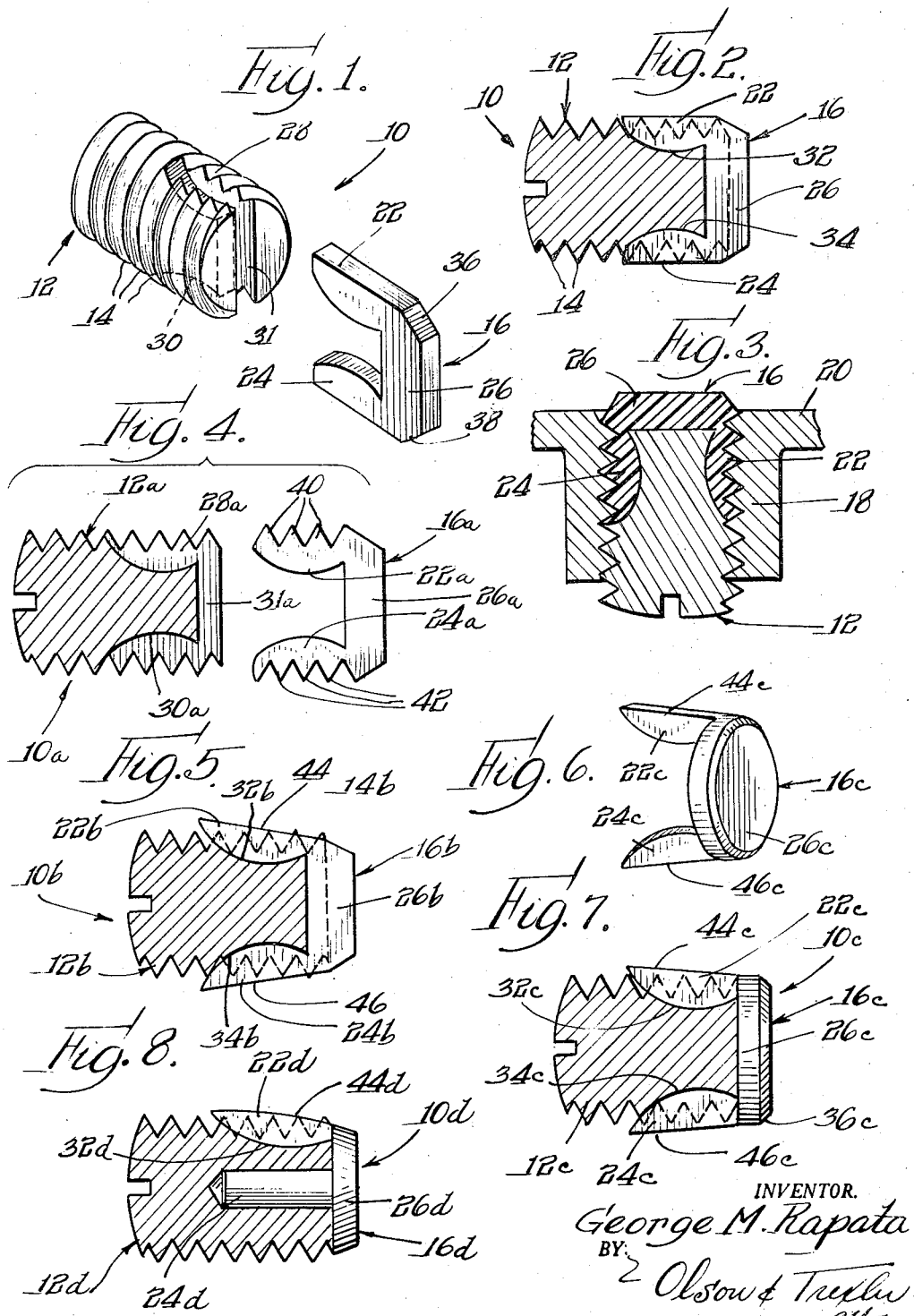
Sept. 16, 1958 — G. M. RAPATA — 2,852,056
SCREW WITH PLASTIC INSERT WHICH LOCKS AND SEALS
Filed May 31, 1955
INVENTOR.
George M. Rapata
BY Olson & Trexler
Attys.

2,852,056

SCREW WITH PLASTIC INSERT WHICH LOCKS AND SEALS

George M. Rapata, Park Ridge, Ill., assignor to Illinois Tool Works, Chicago, Ill., a corporation of Illinois Application May 31, 1955, Serial No. 511,879

2 Claims. (Cl. 151—7)

The present invention relates to a novel threaded device adapted to be applied to a complementary threaded workpiece, and more particularly to a novel device such as a threaded plug or screw member.

An important object of the present invention is to provide a novel device of the above described type which is substantially self-locking in assembled relationship with a complementary workpiece.

Another object is to provide a novel self-locking screw member which also forms a seal for preventing fluid from leaking between the threads of the device and the workpiece.

A more specific object of the present invention is to provide a novel device of the above described type having a threaded member and insert of deformable resilient plastic material, which member and insert are formed in a simple and economical manner and so that they may be easily assembled together and securely retained in assembled relationship.

A further object of the present invention is to provide a novel device of the type set forth in the preceding paragraph wherein the threaded member and the insert are formed so as to facilitate application thereof to a complementary workpiece and to insure an aggressive locking action and a fluid tight seal between the insert and the threaded member as well as between the device and the workpiece.

Other objects and advantages of the present invention will become apparent from the following description and the accompanying drawings wherein:

Fig. 1 is an exploded perspective view showing a device embodying one form of the present invention;

Fig. 2 is a sectional view of a device incorporating the features of the present invention;

Fig. 3 is a sectional view showing the device of Fig. 2 applied to a workpiece;

Fig. 4 is an exploded sectional view showing a slightly modified form of the present invention;

Fig. 5 is a sectional view showing another modified form of the present invention;

Fig. 6 is a perspective view showing a further modified insert incorporating the features of the present invention;

Fig. 7 is a partial sectional view showing a device including the insert of Fig. 6; and Fig. 8 is a partial sectional view showing a device embodying another modified form of the present invention.

Referring now more specifically to the drawings wherein like parts are designated by the same numerals throughout the various figures, a device 10 embodying one form of the present invention is shown in Figs. 1, 2 and 3. The device 10 includes a member 12 having a plurality of helical thread convolutions 14 formed thereon and an insert 16. In the particular embodiment shown for the purpose of illustrating the present invention, the member 12 may be used as a plug for various threaded workpieces such as pipes, tanks or receptacles. In Fig. 3 the plug is shown as applied to an internally threaded nipple 18 which provides a drain opening for a receptacle such as an oil pan 20 of an internal combustion engine. However, it will be appreciated that the device 12 might also be used as a set screw for the various work structures wherein the self-locking and self-sealing characteristics of the device 10 are desirable, and the plug or screw 12 might be modified by providing it with a head portion of any known configuration.

The insert 16 includes a pair of spaced generally parallel leg portions 22 and 24 which are integrally joined by a bight portion 26. The leg portions are adapted to be inserted into generally axially extending slots or recesses 28 and 30 formed in the member 12 adjacent the entering end thereof. If desired, a transverse slot 31 may be provided in the end face of the threaded member 12, which slot may be formed either to partially or fully receive the bight portion 26 of the insert. The slots and insert leg portions are of sufficient length so that they traverse a plurality of the thread convolutions 14, and as shown best in Figs. 2 and 3, the slots are sufficiently deep so that bottom surfaces 32 and 34 thereof are disposed below or within the roots of the thread convolutions. It should be noted that the bottom surfaces 32 and 34 of the slots are curved or arcuate in shape and are formed so that their deepest portions are spaced axially from the entering end of the threaded member 12. In addition, the insert leg portions 22 and 24 are provided with complementary curved inner edges engageable with the bottom surfaces of the slots. With this structure it will be appreciated that the insert may be easily assembled with the threaded member merely by snapping the leg portions into the slots, and the curved edges of the leg portions will interengage with the bottom surfaces of the slots to prevent the insert from becoming axially separated from the threaded member.

The insert 16 is formed from any suitable deformable resilient plastic material such as nylon. As shown in Figs. 1 and 2 the leg portions 22 and 24 have smooth unthreaded outer margins, and the leg portions are formed so that they initially are substantially as wide as the slots 28 and 30 and have a radial thickness which is at least as great as the depth of the slots. Thus, when the device 10 is applied to a workpiece as shown in Fig. 3, the workpiece will impress complementary thread segments in the outer margins of the leg portions 22 and 24. The inherent resiliency of the plastic material causes these thread segments to grip the workpiece aggressively and restrain unauthorized retograde movement of the device. Furthermore, the plastic material of the leg portions is deformed so that it completely fills and seals segments of the workpiece thread convolutions so that fluid is prevented from following the helical path of the thread convolutions and leaking from the container or workpiece.

The entering end of the insert is provided with beveled corners 36 and 38 so as to facilitate initial entry of the device 10 into the workpiece aperture. During application of the device 10 to the apertured workpiece, the leading or entering end portions of the legs 22 and 24 initially engage the threads of the workpiece, and as the device is turned ad pressed into the workpiece, the workpiece threads will start to impress complementary thread segments adjacent the entering ends of the legs. As this occurs, the pressure applied to the entering end portions of the legs causes these portions to be deformed inwardly and the trailing end portions to flare outwardly whereby starting of the thread segments in the leg portions is facilitated. As the device 10 is threaded further into the workpiece, the trailing portions of the legs progressively engage the workpiece thread convolutions and the legs are rocked or deformed inwardly so that they seat firmly against the bottoms of the slots. It should be noted that the arcuate or curved formation of the slot bottoms and the inner edges of the legs 22 and 24 promotes the rocking action of the legs and also serves to insure proper seating of the legs in the slots and aggressive engagement of the legs throughout their lengths with the workpiece threads.

Fig. 4 shows a modified form of the present invention which is similar to the above described structure as indicated by the application of identical reference numerals with the suffix "a" added to corresponding elements. This embodiment differs only in that the legs 22a and 24a are respectively provided with preformed helical thread segments 40 and 42. These thread segments facilitate application of the device to a complementary threaded workpiece, and they are oversized as compared with the threads of the member 12a and the workpiece so that they will be deformed and compressed whereby to provide an effective locking and sealing action.

Fig. 5 shows another modified form of the present invention which is similar to the above described structures as indicated by the application of identical reference numerals with the suffix "b" added to corresponding elements. This embodiment differs in that the outer edges 44 and 46 of the insert legs are tapered in the manner shown instead of being substantially parallel as are the corresponding edges of the insert shown in Figs. 1 through 3. It should be noted that the edges 44 and 46 are inclined or tapered so that they lie within the crest of the thread convolution 14b at the entering end of the member 12b. This arrangement promotes even easier starting of the device into the workpiece.

Figs. 6 and 7 show a further modified form of the present invention which is similar to the above described structures as indicated by the application of identical reference numerals with the suffix "c" added to corresponding elements. In this embodiment the bight portion 26c is in the form of a solid circular member which completely overlies the entering end of the threaded member 12c. This embodiment is especially useful as a set screw or in any installation wherein the nose member 26c is to be forced against a solid workpiece with sufficient pressure to cause the nose member to be deformed radially outwardly to provide a continuous seal and lock around the interior of a threaded workpiece. While the edges 44c and 46c of the insert leg portions are shown as disposed in tapering or converging relationship, it will be appreciated that these edges may be substantially parallel or they may be provided with preformed oversized thread segments.

In Fig. 8 there is shown another modified form of the present invention which is similar to the above described structure as indicated by the application of identical reference numerals with the suffix "d" added to corresponding elements. In this embodiment the outer edge 44d of the insert leg portion 22d is similar to the above described leg portion edge 44 except that it is curved so as further to facilitate entry of the device into the workpiece aperture and to promote proper rocking action of the leg. In addition, this embodiment differs in that the leg portion 24d is in the form of an axially extending pin centrally located with respect to the bight portion or nose member 26d, and the threaded member 12d is provided with a central axially extending aperture or recess for receiving the pin. Thus, the device 10d provides only a single sealing and locking leg portion. While the sealing and locking action of the single leg portion is not as great as the two leg portions of the above described embodiments, it will be sufficient for many uses. It will be appreciated that any of the above described embodiments may be modified by eliminating one of the locking and sealing leg portions and replacing it with a central pin extending into a central aperture in the threaded member as shown in Fig. 8.

From the above description it is seen that the present invention has provided a novel rotary threaded device having a threaded member preferably formed from metal and a deformable plastic insert which are simply and economically formed and which may be easily assembled together. Furthermore, it is seen that the present invention has provided a novel rotary threaded device such for example as a screw or a plug which may be readily applied to a workpiece and which has substantial resistance to unauthorized retrograde movement and an effective sealing action.

While the preferred embodiments of the present invention have been shown and described herein, it is obvious that many structural details may be changed without departing from the spirit and scope of the appended claims.

The invention is claimed as follows:

1. A locking screw for use in a complementary threaded workpiece including a male screw member having helical thread convolutions thereon terminating at the entering end of the screw shank, said shank having in the vicinity of its entering end a pair of axially extending slots diametrically disposed in the periphery of the threaded shank, each of said slots having a variable depth throughout the length thereof with the greatest depth occurring intermediate the ends of each slot, and a locking insert of deformable plastic material adapted to be sprung into non-rotatable mounted position on said screw shank and including a pair of arms of complemental shape with respect to said slots interconnected by a bight portion which traverses the leading end surface of said screw, said bight portion being circular and conforming in size to the leading end surface of said screw, a peripherally continuous portion of the axial thickness of said bight portion having a diameter greater than the root diameter of the threads on the periphery of the screw shank and approximating the crest diameter of said threads, the axial extent of said bight portion being such as to afford sufficient material to be deformed radially outwardly to provide a continuous seal and lock around the interior of a threaded workpiece, at least one of the arms of said insert presenting a surface which extends radially beyond portions of the adjacent screw threaded surface to present a locking surface to restrain unauthorized retrograde movement of the screw member relative to the complementary threaded workpiece.

2. A locking screw as set forth in claim 1, wherein the bight portion in the direction of the leading end thereof has a radially relieved margin which provides a nose portion to facilitate mounting of said screw in the threaded workpiece.

References Cited in the file of this patent

UNITED STATES PATENTS

| Re. 23,878 | Burdick | Sept. 28, 1954 |
| 1,158,454 | De Camp | Nov. 2, 1915 |
| 1,364,298 | Nies | Jan. 4, 1921 |
| 1,576,062 | Passmore | Mar. 9, 1926 |
| 1,996,716 | Boitel | Apr. 2, 1935 |
| 2,159,886 | Simmonds | May 23, 1939 |
| 2,273,102 | Harris et al. | Feb. 17, 1942 |
| 2,533,894 | Podell | Dec. 12, 1950 |
| 2,568,640 | Kindelberger | Sept. 18, 1951 |

FOREIGN PATENTS

| 566,254 | Great Britain | Dec. 20, 1944 |